United States Patent [19]
Stifelman

[11] Patent Number: 6,024,869
[45] Date of Patent: Feb. 15, 2000

[54] SPIN-ON FILTER ASSEMBLY WITH VALVE ARRANGEMENTS

[75] Inventor: Jack Stifelman, Bolivar, Mo.

[73] Assignee: Donaldson Company, Inc., Minneapolis, Minn.

[21] Appl. No.: 09/010,959

[22] Filed: Jan. 22, 1998

[51] Int. Cl.[7] .......................... B01D 27/10; B01D 35/14; B01D 35/147; B01D 35/153
[52] U.S. Cl. .......................... 210/130; 210/111; 210/133; 210/137; 210/418; 210/424; 210/433.1; 210/440; 210/443; 210/444; 210/DIG. 17
[58] Field of Search .................................. 210/111, 130, 210/133, 137, 418, 424, 433.1, 440, 443, 444, DIG. 17, 168

[56] References Cited

U.S. PATENT DOCUMENTS

| 3,490,593 | 1/1970 | Pohoski . |
|---|---|---|
| 3,783,590 | 1/1974 | Allen . |
| 3,819,052 | 6/1974 | Firth . |
| 3,827,558 | 8/1974 | Firth . |
| 3,847,819 | 11/1974 | Firth . |
| 4,369,113 | 1/1983 | Stifelman . |
| 4,428,834 | 1/1984 | McBroom et al. . |
| 4,446,019 | 5/1984 | Robinson . |
| 4,465,595 | 8/1984 | Cooper . |
| 4,480,160 | 10/1984 | Stifelman . |
| 4,512,882 | 4/1985 | Fischer et al. . |
| 4,522,712 | 6/1985 | Fischer et al. . |
| 4,552,662 | 11/1985 | Webster et al. . |
| 4,611,627 | 9/1986 | Eidsvoog et al. . |
| 4,615,800 | 10/1986 | Stifelman et al. . |
| 4,743,374 | 5/1988 | Stifelman . |
| 4,834,885 | 5/1989 | Misgen et al. . |
| 4,883,083 | 11/1989 | Fisher et al. . |
| 5,104,537 | 4/1992 | Stifelman et al. . |
| 5,342,519 | 8/1994 | Friedmann et al. . |
| 5,395,518 | 3/1995 | Gulsvig . |
| 5,501,791 | 3/1996 | Theisen et al. . |
| 5,814,211 | 9/1998 | Leo . |

FOREIGN PATENT DOCUMENTS

| 0 089 446 A1 | 9/1983 | European Pat. Off. . |
|---|---|---|
| 0 658 362 A2 | 6/1995 | European Pat. Off. . |
| 0 819 458 A1 | 1/1998 | European Pat. Off. . |
| 42 06 420 A1 | 9/1993 | Germany . |

Primary Examiner—John Kim
Assistant Examiner—Michael Fleming
Attorney, Agent, or Firm—Merchant & Gould P.C.

[57] ABSTRACT

A filter head for use in cooperative engagement with an associated liquid filter comprises a block member having a bypass valve assembly, and a back pressure flow valve assembly. The block member defines an inlet port; an inlet channel positioned for fluid communication between the inlet port and the associated liquid filter; a first outlet port; a second outlet port; and an outlet channel positioned for fluid communication between the associated liquid filter and the first and second outlet ports. When in an open orientation, the bypass valve provides fluid communication between the inlet channel and the outlet channel. When in a closed orientation, the bypass valve blocks fluid communication between the inlet channel and the outlet channel. The back pressure flow valve assembly, when in an open orientation, provides fluid communication between the outlet channel and the second outlet port. When in a closed orientation, the back pressure flow valve assembly blocks fluid communication between the outlet channel and the second outlet port.

20 Claims, 8 Drawing Sheets

SPIN-ON FILTER ASSEMBLY WITH VALVE ARRANGEMENTS

FIELD OF THE INVENTION

The present invention relates generally to fluid filters, filter heads, and valve arrangements for such systems. More particularly, the invention concerns filter heads adapted for use with spin-on filters, wherein the filter head includes bypass valve and back pressure flow valve assemblies.

BACKGROUND OF THE INVENTION

Spin-on filter arrangements have been employed in a variety of applications including, for example, hydraulic systems, fuel systems, and lubrication systems. Such filter arrangements can generally include a filter clement positioned within a can, casing, or housing having a cover or top plate at one end thereof, by which the filter can be mounted on a filter head or filter base. A central opening and several surrounding openings in the cover are usually provided to direct flow through the filter and filter element therein, which flow can be either an inside/out (reverse flow) or an outside/in (forward flow) pattern.

Spin-on filters are typically intended to be used for a limited period, with follow up removal and replacement during servicing. Herein, the combination of can, element, and other components which are "spun" (i.e. threaded) or are otherwise mounted onto the filter head will sometimes be referred to as the removable and replaceable filter cartridge or cartridge assembly.

Fluid filters which are part of systems having components downstream from the filter itself are of a concern. Particularly, it is of concern to prevent cavitation of pumps in such systems. Conditions such as cold starts, flow surges, or occluded elements can result in damaged downstream components. Improvements are desirable.

SUMMARY OF THE INVENTION

The invention is directed to a filter head for use in cooperative engagement with an associated liquid filter. The filter head comprises a block member having a bypass valve assembly, and a back pressure flow valve assembly. The block member defines an inlet port; an inlet channel positioned for fluid communication between the inlet port and the associated liquid filter; a first outlet port; a second outlet port; and an outlet channel positioned for fluid communication between the associated liquid filter and the first and second outlet ports. The bypass valve assembly, when in an open orientation, permits fluid to flow from the inlet channel and bypass the associated liquid filter. When in a closed orientation, the bypass valve assembly forces fluid to flow from the inlet channel and through the associated liquid filter. The back pressure flow valve assembly, when in an open orientation, provides fluid communication between the outlet channel and the second outlet port. When in a closed orientation, the back pressure flow valve assembly blocks fluid communication between the outlet channel and the second outlet port.

In one embodiment, when in the open orientation, the bypass valve provides fluid communication between the inlet channel and the outlet channel. When in the closed orientation, the bypass valve blocks fluid communication between the inlet channel and the outlet channel.

Preferably, the block member includes a body member and an adapter member. In preferred embodiments, the body member defines the inlet port, the inlet channel, the outlet channel, and the first outlet port; while the adapter member defines the second outlet port.

Preferably, the adapter member further includes a collector cavity in fluid communication with the outlet channel. In one preferred embodiment, the bypass valve assembly is constructed and arranged to provide fluid communication between the inlet channel and the collector cavity, when in the open orientation; and to block fluid communication between the inlet channel and the collector cavity, when in the closed orientation.

In preferred embodiments, the bypass valve assembly comprises a first bore defined by the body member; a first spring loaded valve head positioned within the first bore; a first valve seat defined by the body member; and a second bore defined by the body member; the second bore being in fluid-flow communication with the collector cavity. Preferably, the bypass valve assembly, when in the closed orientation, has the first valve head biased against the first valve seat, by a first spring member, to block fluid communication between the inlet channel and the second bore. When in the open orientation, the bypass valve assembly preferably has the first valve head biased against the first spring member and away from the first valve seat, to permit fluid communication between the inlet channel and the second bore.

In one preferred application, the bypass valve assembly further includes a conduit defined by the body member in extension between the outlet channel and the first bore. This permits the bypass valve to operate in response to a fluid pressure differential between the outlet channel and the inlet channel.

Preferably, the back pressure valve assembly comprises a bore defined by the adapter member; a valve head positioned within the bore; and a valve seat defined by the adapter member. In preferred implementations, the back pressure valve assembly, when in the closed orientation, has the valve head biased against the valve seat, by a biasing member, to block fluid communication between the collector cavity and the second outlet port, while in the open orientation, the valve head is biased against the biasing member and away from the valve seat, to permit fluid communication between the collector cavity and the second outlet port.

In preferred arrangements, a gasket member circumscribes the collector cavity. This provides a fluid seal between the body member and the adapter member.

The invention is also directed to a liquid filter assembly comprising a filter housing and a filter head in fluid communication with the filter housing. A filter media construction is positioned within the housing. The filter media construction, in combination with the housing, defines an unfiltered liquid volume and a filtered liquid volume. The filter head is preferably as described above.

It is to be understood that both the foregoing general description and the following detailed description are exemplary and explanatory only and are not restrictive of the invention as claimed.

The accompanying drawings, which are incorporated in and constitute a part of this specification, illustrate one embodiment of the invention and together with the description, serve to explain the principles of the invention.

DETAILED DESCRIPTION

Reference will now be made in detail to the present preferred embodiments of the invention, examples of which are illustrated in the accompanying drawings.

I. Overview of Components and General Operation

Figure 1:
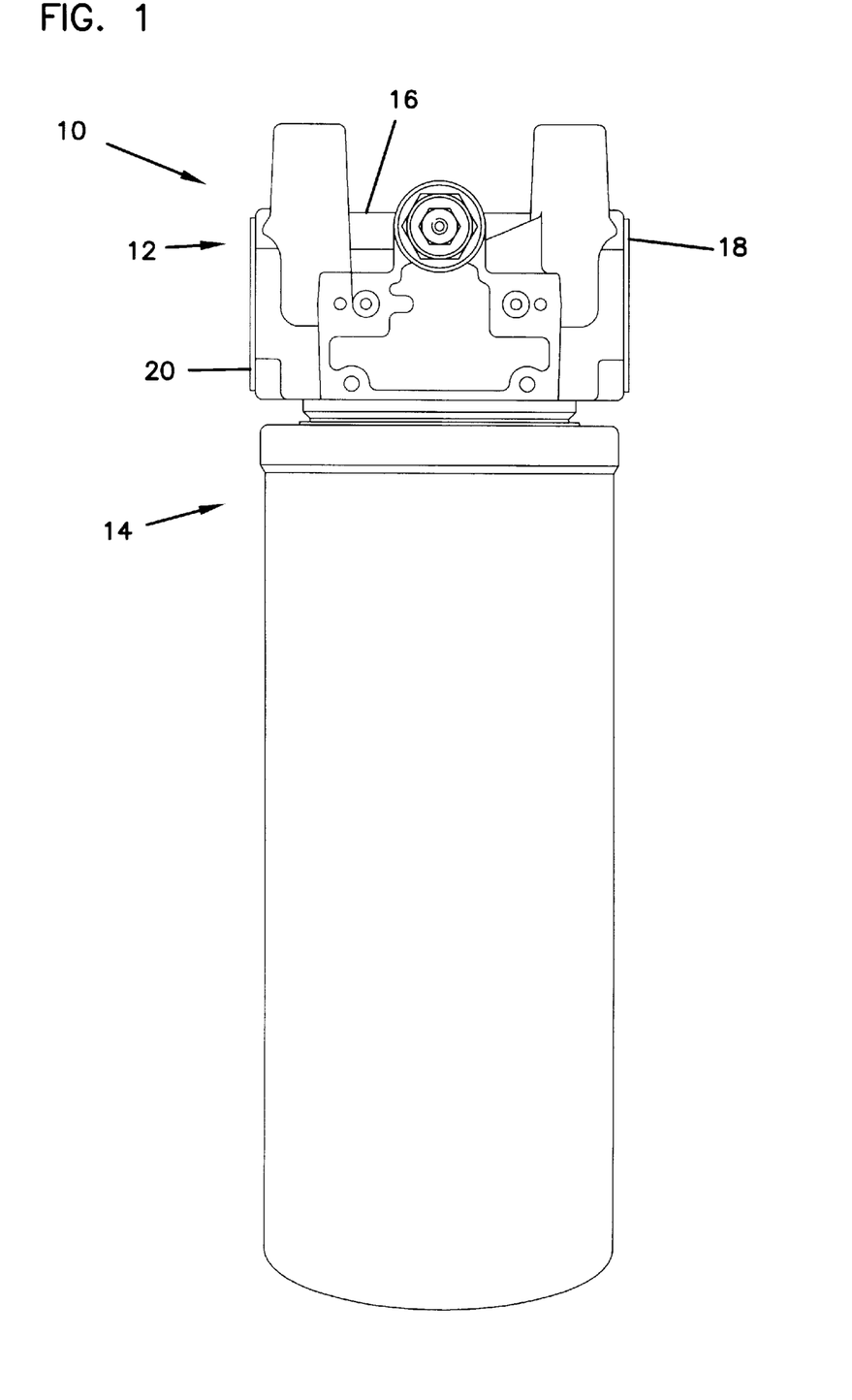
FIG. 1 is a side elevational view of one embodiment of a filter cartridge mounted on a filter head, according to the present invention.

In FIG. 1, a liquid filter assembly is illustrated generally at 10. The assembly 10 includes a filter head 12 and a filter cartridge 14 mounted thereto. In the illustrated embodiment, the filter cartridge 14 is a spin-on filter. That is, the filter cartridge 14 is spun (or threaded) onto the filter head 12 to be securably mounted thereto.

Figure 3:
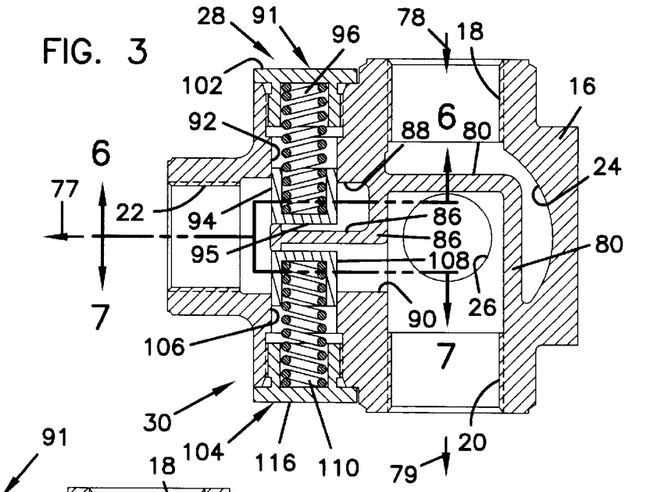
FIG. 3 is a cross-sectional view of the filter head and cartridge taken along the line 3—3 in FIG. 2, and showing a bypass valve arrangement and a back pressure flow valve arrangement in closed orientations.

The filter head 12 includes a block 16 (typically a cast metal block) defining an inlet 18 and a first outlet 20. Referring now to FIG. 3, the filter head 12 also defines a second outlet 22. The filter head 12, when used in association with the filter cartridge 14, is in fluid communication with the filter cartridge 14. An inlet channel 24 is in fluid communication with the filter head inlet 18. An outlet channel 26 extends in fluid communication between the filter cartridge 14 and the first outlet 20. Preferably, the inlet 18, outlets 20, 22 and channels 24, 26 are oriented so that they can be formed during casting.

Figure 4:
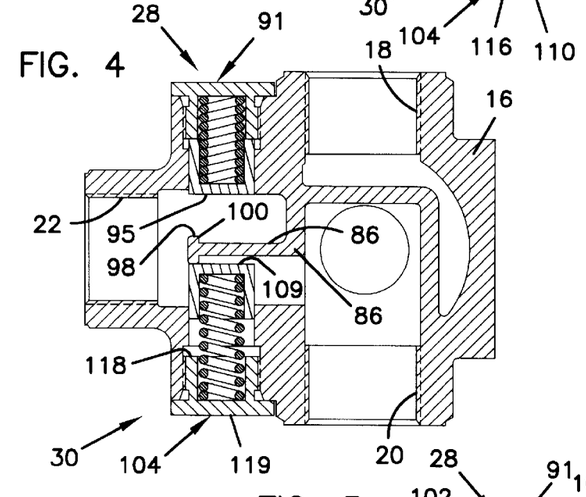
FIG. 4 is a cross-sectional view of the filter head analogous to FIG. 3, but depicting the bypass valve arrangement in an open orientation and the back pressure flow valve arrangement in a closed orientation.
Figure 5:
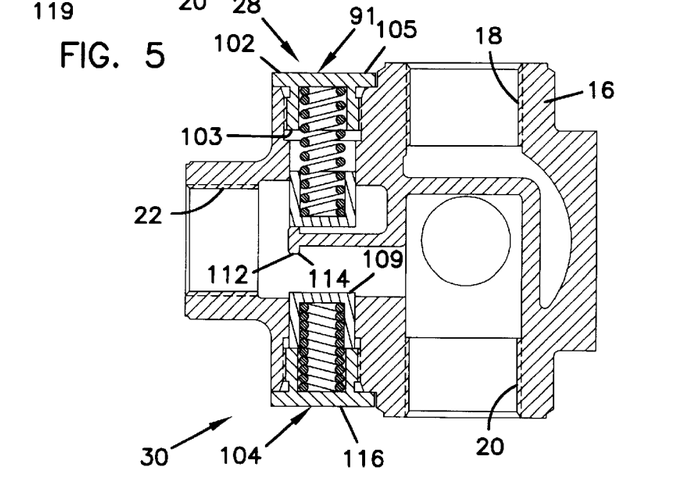
FIG. 5 is a cross-sectional view of the filter head analogous to FIGS. 3 and 4, but depicting the bypass valve arrangement in a closed orientation and the back pressure flow valve arrangement in an open orientation.

Referring to FIG. 3, the filter head 12 includes a first valve assembly, shown generally at 28. A second valve assembly in the filter head 12 is illustrated generally at 30. FIG. 3 illustrates both the first valve assembly 28 and second valve assembly 30 in closed orientations. That is, both the first valve assembly 28 and second valve assembly 30 are blocking fluid communication to the second outlet 22. In FIG. 4, the first valve assembly 28 is illustrated in an open orientation, and the second valve assembly 30 is illustrated in a closed orientation. In FIG. 5, the second valve assembly 30 is illustrated in an open orientation, and the first valve assembly 28 is illustrated in a closed orientation.

Figure 2:
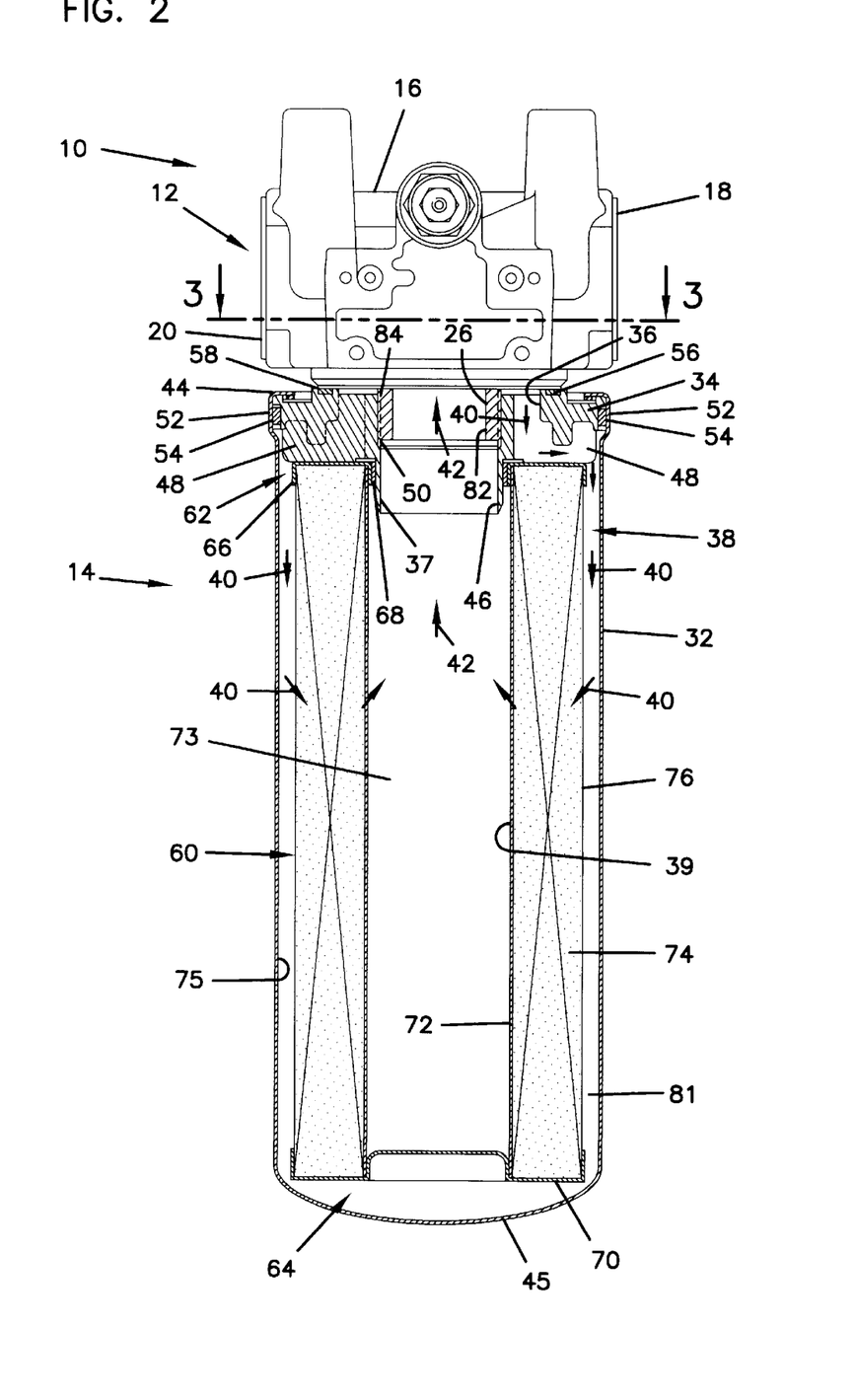
FIG. 2 is a view analogous to FIG. 1, but depicting the filter cartridge in cross-section.

In reference to FIG. 2, the filter cartridge 14 includes a can or housing 32. A cover 34 is disposed within the housing 32 to cover or close one end of the housing 32. The cover 34 defines an inlet 36 in fluid flow communication with the inlet channel 24 of the filter head 12. The cover 34 defines an outlet 37 centrally disposed therein, and in fluid flow communication with the outlet channel 26 of the filter head 12. The filter cartridge 14 also includes a filter media construction 38 positioned within the housing 32, and defining an open interior 39.

In general, fluid is filtered by passing through the inlet 18 in the direction of arrow 78 (FIG. 3), through the inlet channel 24, and into the filter cartridge 14 through the inlet 36 (FIG. 2). From there, for the "forward flow" system depicted, the fluid flows between the wall of the housing 32 and the media construction 38 as shown at arrows 40. Next, the fluid flows through the media construction 38 into the interior 39 of the media construction 38. The fluid then flows through the outlet 37 and into the outlet channel 26 of the filter head 12 shown at arrows 42. During normal operation, that is, when the first valve assembly 28 is closed and the second valve assembly 30 is open (FIG. 5), the majority of the fluid exits the filter head 12 through the second outlet 22, and a fraction of the fluid exits the first outlet 20 in the direction of arrow 79. From the second outlet 22, the fluid may be returned to a reservoir or tank. From the first outlet 20, the fluid may flow to sensitive downstream components, such as a pump, whose flow demand typically is fractional with respect to total inlet flow at arrow 78.

If the media construction 38 should become occluded, or during other conditions such as cold starts or flow surges, the first valve assembly 28 may move from its closed orientation, FIG. 3, into an open orientation, one example of such as illustrated in FIG. 4. When this happens, fluid is allowed to bypass the media construction 38 and flow through the second outlet 22 of the filter head 12. The second outlet 22 may lead to, for example, directly to a reservoir.

II. Subassemblies

A. Filter Cartridge Assembly

In reference to FIG. 2, the filter cartridge 14 is illustrated in cross-section. The filter cartridge 14 filters fluids including gas or liquids, and more particularly, liquids such as oil, hydraulic fluids, or other lubricating types of fluids, for example. The housing 32 is generally cylindrical in shape and includes an open end 44 and a closed end 45. The housing 32 is of a generally thin walled construction, and is typically formed from metal such as steel or other suitable materials.

The cover 34 closes the open end 44 of the housing 32. The cover 34 comprises a central axially extending hub 46 which is including a plurality of radial webs or ribs 48. The hub 46 defines a central opening extending through the cover 34 and terminating in the interior 39 of the media construction 38. As such, the central opening of the hub 46 defines a flow port for the outlet 37. A threaded portion 50 is provided on the internal surface of the hub 46 for connecting the filter cartridge 14 to the filter head 12. A radially sealing gasket member 52 is positioned between the cover 34 and the housing 32 to create a fluid seal between the media construction 38 and the housing 32. An axially sealing gasket member 56 is disposed on an exterior surface of the cover 34 to provide a fluid tight seal 58 between the filter head 12 and the filter cartridge 14.

The media construction 38 includes a filter element 60, generally cylindrical in shape having an open end 62 and a closed end 64. The open end 62 is covered by a first end cap 66. First end cap 66 includes an opening 68 to permit access to the interior 39, which is defined by the inner diameter of the filter element 60. When containing liquid, the interior 39, in the arrangement shown, holds at least a portion of a filtered liquid volume 73. The filtered liquid volume 73 is defined, at least in part, by the inner diameter of the filter element 60.

The closed end 64 of the filter element 60 is covered by a second end cap 70. The first end cap 66 and second end cap 70 are illustrated in the figures as sheet metal end caps with a media potted therein by a polymeric binder such as urethane. However, it is contemplated that the first and second end caps 66, 70 may also be constructed from a polymeric material.

The filter element 60 has a perforated inner liner 72 cylindrically lining the downstream surface of the media and defining the interior 39. Preferably, the inner liner 72 is constructed of metal, but can be made of other materials, such as plastic. Filter media 74 surrounds the inner liner 72 and also forms an exterior surface 76 of the filter element 60. The exterior surface 76 also corresponds to the upstream surface, when the filter arrangement operates in a forward-flow manner. Filter media 74 may be any media sufficient to effectively filter whatever fluid is in the system. The type of media will depend upon what fluid is being filtered, what kind of system the filter is in, and could include other variables. In terms of the principles of operation of the first and second valve assemblies 28, 30 in the filter head 12, there is no preference for any particular type of filter media. However, in a typical system, the filter media 74 can include a fluted or pleated media. Typically, this may include paper media or cellulose fiber media, sometimes including at least one side treated with polymeric fine fibers or expanded polytetrafluorethylene (PTFE). Other types of media may also be used.

A space defined between the wall of the housing 32 and the media 74 comprises a fluid channel 75. Fluid channel 75 generally holds unfiltered fluid, prior to its flowing downstream. The channel 75, when containing liquid, holds an unfiltered liquid volume 81.

The above description of filter cartridge 14 is of a type described in U.S. Pat. No. 4,369,113 to Stifelman, hereby incorporated by reference. As described in U.S. Pat. No. 4,369,113, fluid filters may be utilized for filtering from the outside inwardly, or from the inside outwardly. For the preferred embodiment described herein, the filter cartridge 14 is described as forward-flow. However, the opposite arrangement may be utilized with appropriate modifications, as will be understood to those skilled in the art.

B. Filter Head Arrangement

Referring now to FIG. 3, a cross-sectional view of the filter head 12 is illustrated. The block 16 defines the inlet 18. The inlet 18 comprises a generally cylindrical bore defined by the block 16 extending from one side of the block 16 to the inlet channel 24. The inlet 18 and inlet channel 24 together define a fluid flow passageway for liquid flowing in at arrow 78. When the filter cartridge 14 is mounted on the filter head 12, the inlet channel 24 is in fluid flow communication with the inlet 36 of the cover 34 in the filter cartridge 14.

A wall 80 is defined by the block 16 and separates the liquid flow passageway defined by the inlet 18 and inlet channel 24 from the first outlet 20. The first outlet 20 is in fluid communication with the outlet channel 26. Together the first outlet and outlet channel 26 define a fluid flow passageway for liquid flow from the filter cartridge 14. The outlet channel 26 is defined by a cylindrical wall 82, FIG. 2, extending laterally away from the block 16. The wall 82 includes a threaded outer surface for matable engagement with threads 50 in the hub 46 of the cover 34. Through the threaded engagement between the cylindrical wall 82 and the hub 46 of the cover 34, the filter cartridge 14 is spun on and secured to the filter head 12.

Figure 6:
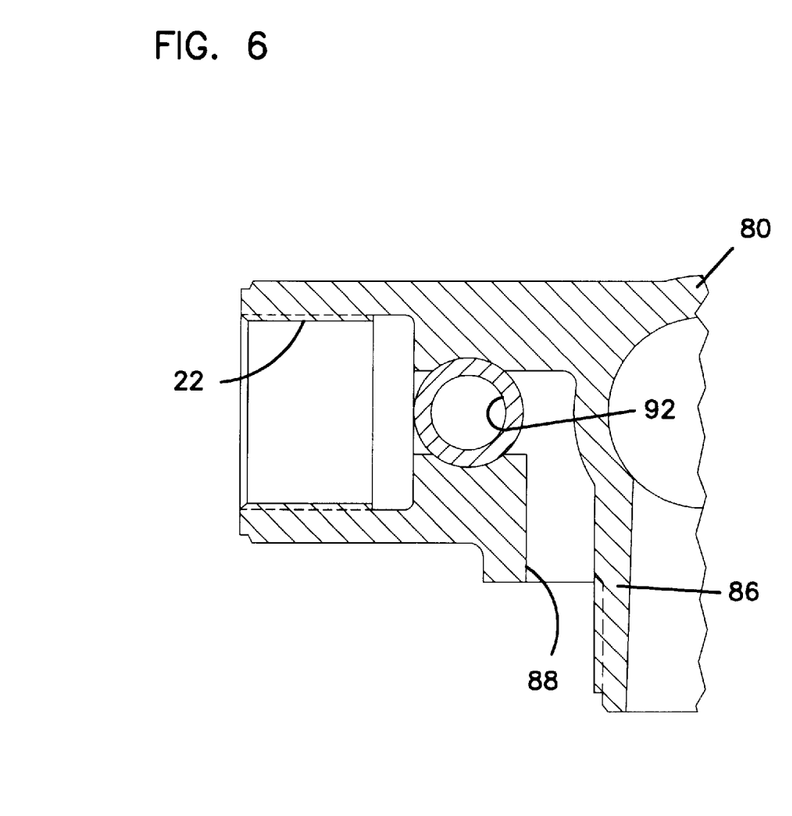
FIG. 6 is an enlarged fragmented cross-sectional view of the filter head depicted in FIG. 1, but without the attached filter cartridge and depicted taken along the line 6—6 in FIG. 3.
Figure 7:
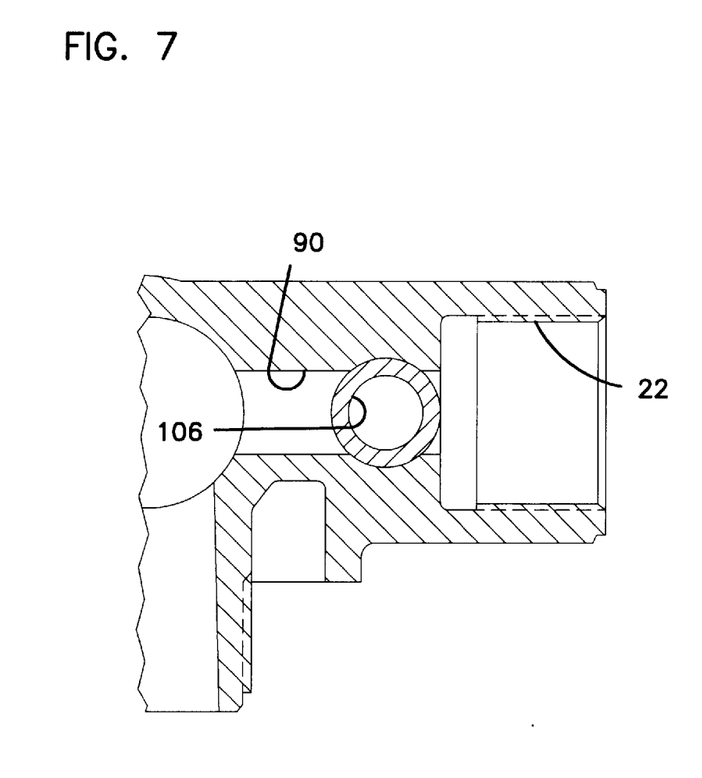
FIG. 7 is an enlarged, fragmentary cross-sectional view of the filter head depicted in FIG. 1 but without the attached filter cartridge and taken along the line 7—7 in FIG. 3, according to the present invention.

The block 16 also defines a wall 86 integral with the wall 80, FIG. 6. The wall 86 separates the first valve assembly 28 from the second valve assembly 30. The block 16 also defines a bypass flow fluid passageway 88 and a back pressure flow passageway 90. When the filter cartridge 14 is mounted on the filter head 12, the filter cartridge inlet 36 is in fluid flow communication with the filter head inlet channel 24, filter head inlet 18, and the bypass flow fluid passageway 88. The outlet 37 of the filter cartridge 14 is in fluid flow communication with the filter head outlet channel 26, the filter head first outlet 20, and the back pressure flow passageway 90.

The first valve assembly 28 is provided in the filter head 12 and is constructed and arranged to selectively permit passage of liquid from the unfiltered liquid volume through the second outlet 22, responsive to a selected liquid pressure level within the unfiltered liquid volume 81. In particular, if the filter element 60 becomes substantially occluded, or if there is a cold start or flow surge condition, the first valve assembly 28 is provided for dealing with these conditions. The assembly 10 of the present invention senses when such conditions occur by monitoring the pressure on the upstream side of the filter element 60. Once the pressure has exceeded a certain predetermined point, the liquid is allowed to bypass the filter element 60. That is, the liquid in the unfiltered liquid volume 81 does not need to pass through the media 74. Rather, the liquid in the unfiltered liquid volume 81 proceeds through the bypass flow passageway 88 and through the second outlet 22.

While a variety of working assemblies are contemplated, in the particular embodiment illustrated, the first valve assembly 28 comprises a bypass valve 91. The bypass valve 91 includes a bore 92 (typically cylindrical in cross section) defined by the block 16 of the filter head 12. A valve head 94 is biased within the bore 92 by a biasing member 96, for example, a coiled spring. The biasing member 96 permits the valve head 94 to reciprocate linearly within the bore 92 and move between a closed orientation, FIG. 3, and open orientations, FIG. 4. The valve head 94 includes a pressure-receiving surface 95, FIG. 4, for bearing liquid pressure forces. The first valve assembly 28 also includes a valve seat 98, FIG. 4, for providing a surface for the biased valve head 94 to engage. The valve seat 98 includes an upstanding flange 100 extending from the wall 86 of the block 16.

The first valve assembly 28 includes a fitment 102 for supporting the biasing member 96 within the bore 92. The fitment 102 allows for access and servicing of the first valve assembly 28 within the filter head 12. The fitment 102 defines a stop surface 103, FIG. 5, at a rim opposite to a surface 105, accessible from the exterior of the block 16. The stop surface 103 provides for a engaging stop of the valve head 94 when the bypass valve 91 is in an open orientation, FIG. 4.

FIG. 3 illustrates the bypass valve 91 in a closed orientation. Specifically, the valve head 94 is biased against the valve seat 98 by the biasing member 96. The engagement of the valve head 94 and the valve seat 98 block passage of liquid flow from the passageway 88 through the second outlet 22.

If there is a condition such as an occluded filter element 60, the liquid pressure level within the unfiltered liquid volume 81 will build. The liquid will press on the surface 95 of the valve head 94. When the force exerted by the liquid pressure exerted on the valve head 94 exceeds the force exerted by the biasing member 96, the first valve assembly 28 will move from its closed orientation into an open orientation. Specifically, the valve head 94 will be pushed by the liquid pressure out of engagement with the valve seat 98. When this happens, the passageway 88 is open to fluid flow communication with the second outlet 22. Liquid in the passageway 88 is allowed to flow through the second outlet 22. That is, liquid from the unfiltered liquid volume 81 bypasses the media construction 38 and flows through the second outlet 22.

It should be noted that the open orientation of the first valve assembly 28 operates in a range of positions, as a function of the degree of element occlusion. At one extreme, the open orientation exists when the valve head 94 is moved just minimally out of touching engagement with the valve seat 98 to open a fluid flow passageway between the second outlet 22 and the passageway 88. FIG. 4 illustrates one example of the first valve assembly 28 being in its fully extended open orientation. That is, the valve head 94 is compressed fully against the fitment 102, such that the valve head 94 is abutting and engaging the stop surface 103 of the fitment 102.

The second valve assembly 30 is disposed within the filter head 12 and is constructed and arranged to selectively permit passage of liquid from the filtered liquid volume 73 through the second outlet 22 in response to a selected liquid pressure level within the filtered liquid volume. The second valve assembly 30 permits the bulk, or majority, of the liquid passing through the assembly 10 to be returned to a surge tank or reservoir, while routing a limited quantity, or fraction, of the filtered liquid to sensitive downstream components, via first outlet 20.

In the particular embodiment illustrated, the second valve assembly 30 includes a back pressure flow valve 104 which, when assembled in the filter head 12, allows the passage of liquid from the filtered liquid volume 73 through the second outlet 22 in response to a liquid pressure level within the filtered liquid volume 73. While a variety of working structures are contemplated, in the particular preferred arrangement illustrated in the drawings, the back pressure flow valve 104 includes a bore 106 (typically cylindrical in cross-section) defined by the block 16 of the filter head 12. A valve head 108 is positioned within the cylindrical bore 106 and includes a pressure-receiving surface 109, FIG. 5, for bearing liquid pressure forces. The valve head 108 is biased by a biasing member 110, for example, a coiled spring, situated within the bore 106. The biasing member 110 permits the valve head 108 to reciprocate linearly within the bore 106 and move between a closed orientation, FIG. 3, and open orientations, FIG. 5.

In FIG. 5, a valve seat 112 is formed by a flange 114 extending from wall 86 of the block 16. The valve seat 112 provides for a surface in which the valve head 108 engages when being biased by biasing member 110 in its closed orientation. A fitment 1 16 supports the biasing member 110 within the block 16 of the filter head 12, and allows for servicing and maintenance of the back flow pressure valve 104. The fitment 116 defines a stop surface 118, FIG. 4, at a rim opposite to the surface 1 19, FIG. 4, on the exterior of the block 16. The stop surface 118 provides for an engaging stop of the valve head 108 when the back pressure flow valve 104 is in one open orientation, FIG. 5.

In FIG. 3, the back pressure flow valve 104 is in a closed orientation. That is, the valve head 108 is in touching engagement with the valve seat 112. This blocks fluid flow between passageway 90 and the second outlet 22. That is, liquid from the filtered liquid volume is blocked from flowing through the second outlet 22. During normal, typical operation, the fluid pressure is sufficient to cause the second valve assembly 30 to be in an open orientation, FIG. 5. That is, the back pressure flow valve 104 permits fluid in the filtered liquid volume 73 to flow through the second outlet 22, where it may be conveyed to, for example, a storage tank. As fluid pressure builds in the filtered liquid volume 73, the liquid pressure exerts a force on the face 109, FIG. 4, of the valve head 108. When the force exerted by the liquid pressure exceeds the force exerted by the biasing member 110, the back pressure flow valve 104 moves from its closed position, FIG. 3, to an open orientation, one example as shown in FIG. 5. That is, when the force exerted by the liquid flow pressure exceeds the force exerted by the biasing member 110, the fluid flow passageway 90 is put into fluid communication with the second outlet 22. This allows the fluid in the filtered liquid volume 73 to flow through the passageway 90 and through the second outlet 22.

The resistance of the biasing member 110 against the flow of liquid causes a positive pressure, or back pressure, within the filtered liquid volume. This positive pressure causes a constant flow of filtered liquid through the first outlet 20.

It should be noted that the open orientation of the second valve assembly is actually a range of positions, depending on the volume of fluid passage required. At one extreme, the open orientation exists when the valve head 108 is moved just minimally out of touching engagement with the valve seat 112 to open a fluid flow passageway between the second outlet 22 and the passageway 90. FIG. 5 illustrates one example of the second valve assembly 30 being in its fully extended open orientation. That is, the valve head 109 is compressed fully against the fitment 116, such that the valve head 108 is abutting and engaging the stop surface 118 of the fitment 116.

For both the first and second valve assemblies 28, 30 the primary variables for controlling the opening from the closed orientation to open orientation are the surface area of the respective valve heads, and the spring constant of the respective biasing members 96, 110. In the preferred embodiment, for the bypass valve 91, the area of fluid passage should be no smaller than required to pass the full flow of the inlet fluid stream 78 at a maximum pressure drop of about 20 psi. The spring design should be such as to not increase the pressure drop of the installed valve 91 by more than about 5 psi, over the cracking pressure to full flow. For the back pressure valve 104, the area of fluid passage should be no smaller than that required to pass the full flow of the inlet fluid stream 78 with not more than about a 10 psi head loss. The spring design should be such that at full flow position, the pressure drop of the installed valve 104 should increase by no more than about 5 psi over the cracking pressure. The spring designs can be altered to obtain varying opening pressures from about 12 psi to about 25 psi with a maximum increase of 5 psi at the full open position, as stated. Of course, other arrangements can also be made, depending upon the particular application. However, these settings are convenient and preferred.

Preferably, the block 16 including walls 80, 86 and surfaces defining the bores for the inlet 18, first outlet 20, second outlet 22, and the bores 92, 106 of the first and second valve assemblies are integrally molded in a die-casting process from a metal.

III. Example Operation

In operation, the particular assembly 10 illustrated in the figures works as follows:

Liquid to the filtered is conveyed from upstream components to the filter head 12, where it enters in the direction of arrow 78 into the port at inlet 18. From there, the liquid flows into inlet channel 24 and then into the filter cartridge 14. The liquid enters the filter cartridge 14 through the inlet 36 in the cover 34, where it becomes part of the unfiltered liquid volume 81. During normal, typical conditions, the liquid then travels in the direction of arrows 40 and passes through the media 74 to the filter element interior 39. There, the liquid becomes part of the filtered liquid volume 73. The liquid then flows in the direction of arrows 42 through the outlet 37 and into the outlet channel 26 of the filter head 12. Typically, the liquid exerts a pressure on the valve head 108, exceeding the force exerted by the biasing member 110, causing the valve head 108 to move out of touching engagement with the valve seat 112. This opens the liquid flow passageway between the passageway 90 and the second outlet 22. The majority of the liquid then flows through the second outlet 22, where it is returned to, for example, a surge tank. Due to the back pressure caused by the second valve assembly 30, a positive pressure is created, pushing a fraction of the filtered liquid through the first outlet 20 in the direction of arrow 79, where it is conveyed to, for example, downstream components.

Should the pressure on the upstream side of the filter element 60 begin to build, for example, if the media 74 clogs, the pressure in the unfiltered liquid volume 81 begins to build. The liquid within the unfiltered liquid volume 81 fills the passageway 88 and exerts pressure on the valve head 94 of the bypass valve 91. When the force exerted by the liquid pressure on the valve head 94 exceeds the force exerted by the biasing member 96, the valve head 94 is moved from touching engagement against the valve seat 98. When this happens, a fluid flow passageway is opened between passageway 88 and second outlet 22. Therefore, liquid from the unfiltered liquid volume 81 flows from the passageway 88 and through the second outlet 22.

IV. A Specific Preferred Embodiment

It will be understood that a wide variety of specific configurations and applications are feasible, using techniques described herein. In this section, a particular fluid filter arrangement with a bypass flow valve and back pressure flow valve is described.

The arrangement described would be particularly configured f or use in a system producing these filter conditions: maximum fluid flow rate of about 40 GPM; typical pressure drop of about 13 psi at 40 GPM; and typical operating temperature range of about −20° F to +250° F.

The filter housing 32 has an outer diameter of about 94 mm. It has a length of about 240 mm. The overall assembly, filter head 12 and filter cartridge 14, has a length of 320 mm.

The bypass valve 91 includes a valve head 94 with a diameter of about 18 mm. The length of the bypass valve 91 in its closed position is about 45 mm.

The back pressure flow valve 104 includes a valve head 109 with a diameter of about 18 mm. The length of the back pressure flow valve 104 in its closed position is about 45 mm.

V. Alternate Embodiment, FIGS. 8–11

A. Overview of Components and General Operation

In FIGS. 8–12, an alternate embodiment of a liquid filter assembly is illustrated generally at 200. The assembly 200 includes a filter head 201 and a filter cartridge 202 mounted thereto. As with the embodiment illustrated in FIG. 1, the filter cartridge 202 is a spin-on filter. The components of the filter cartridge 202 are generally analogous to the filter cartridge 14, depicted in FIGS. 1 and 2 above.

Figure 9:
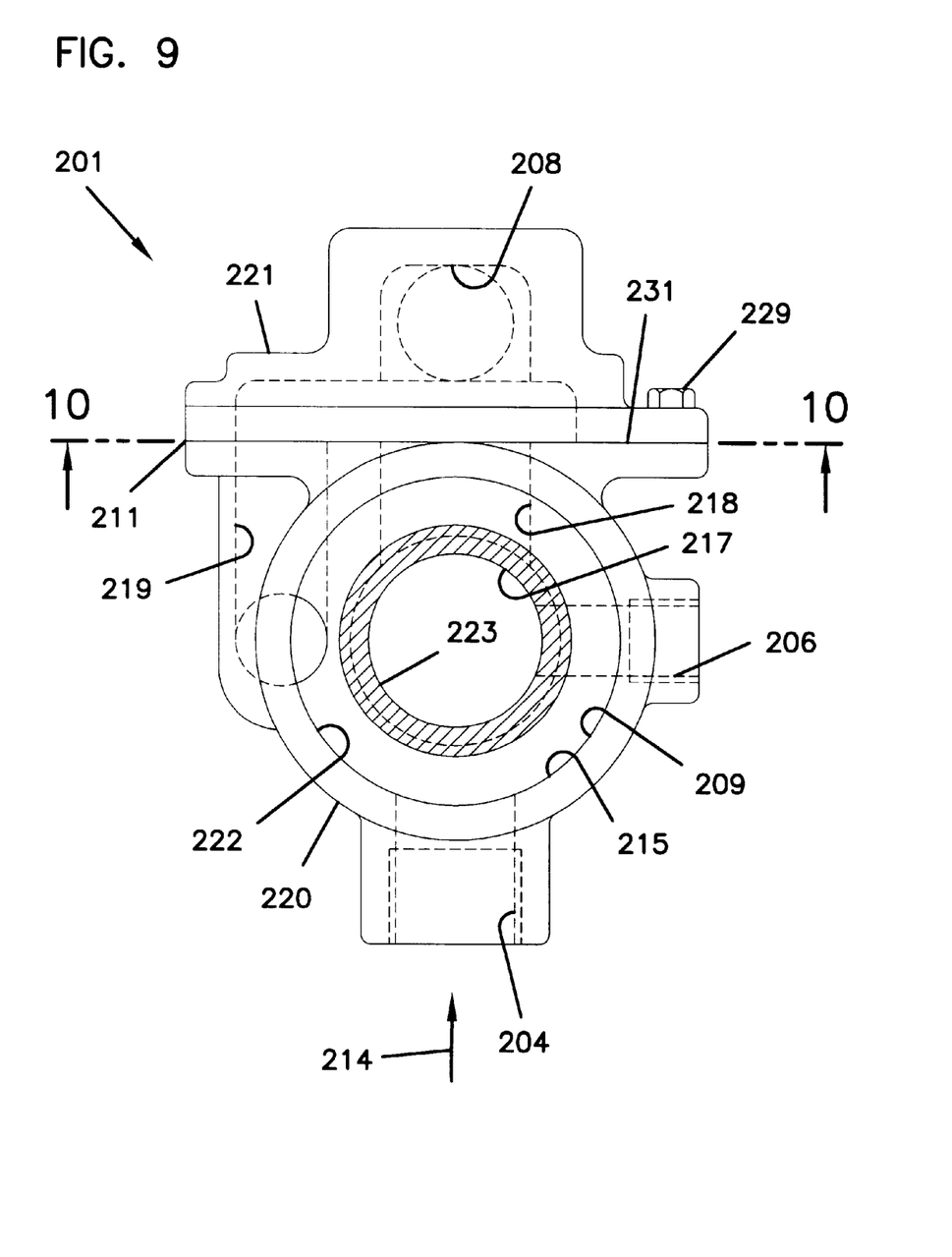
FIG. 9 is a schematic, cross-sectional view of the filter head of FIG. 8, taken along the line 9—9 in FIG. 8.
Figure 10:
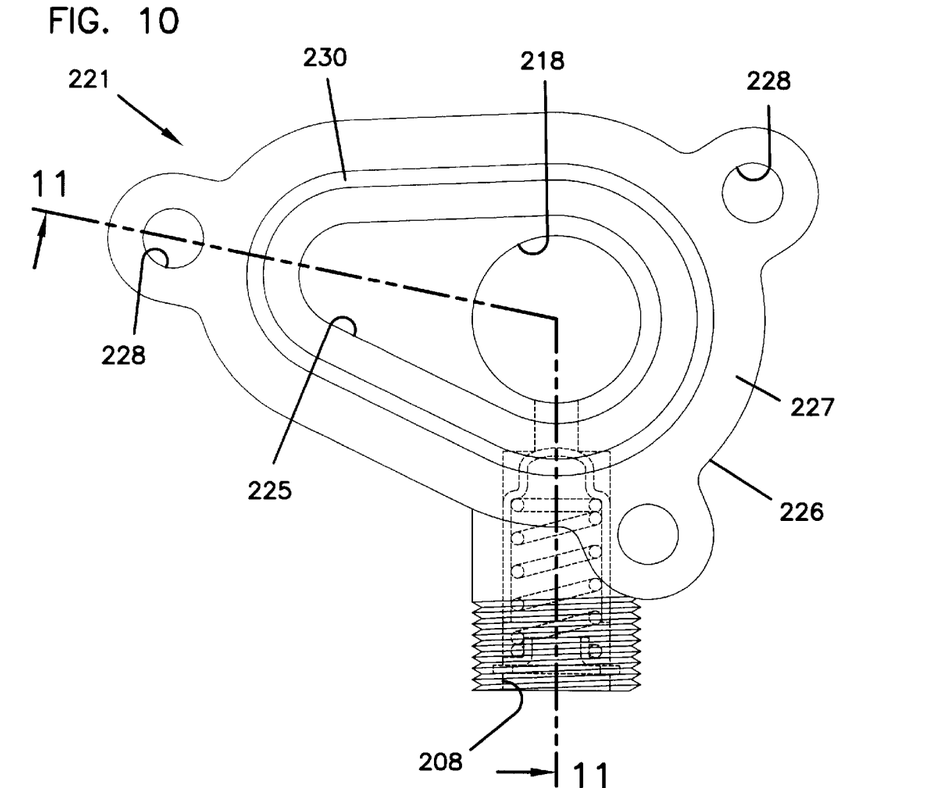
FIG. 10 is a schematic, cross-sectional view of a section of the filter head of FIG. 8, depicting an adapter flange, taken along the line 10—10, FIG. 9.
Figure 11:
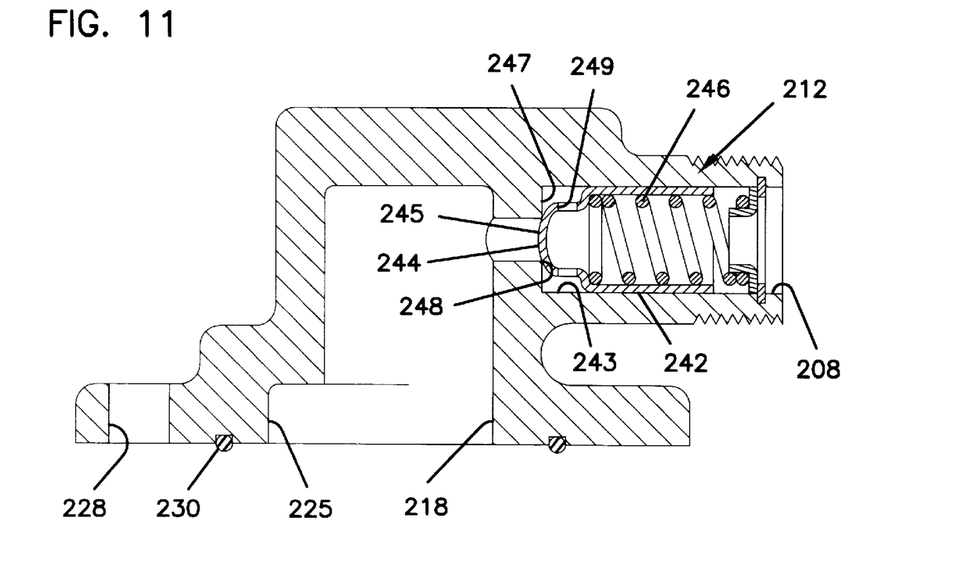
FIG. 11 is a schematic, cross-sectional view of a section of the filter head, showing a back pressure flow valve, taken along the line 11—11, FIG. 10.
Figure 12:
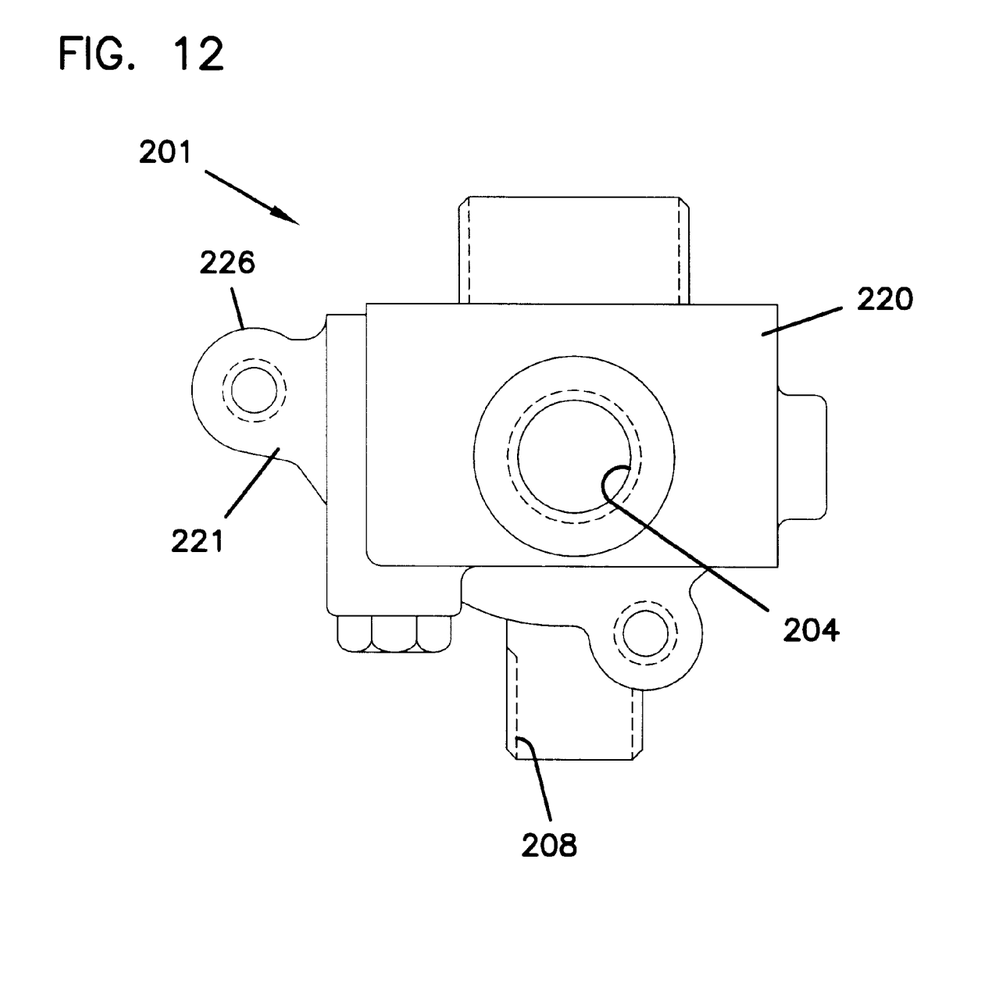
FIG. 12 is a schematic, front side elevational view of the filter head of FIG. 9.

In reference now to FIG. 9, the filter head 201 defines an inlet 204, an aspiration or first outlet 206, and a return-to-tank, or main, or second outlet 208 (FIGS. 10–11).

Figure 8:
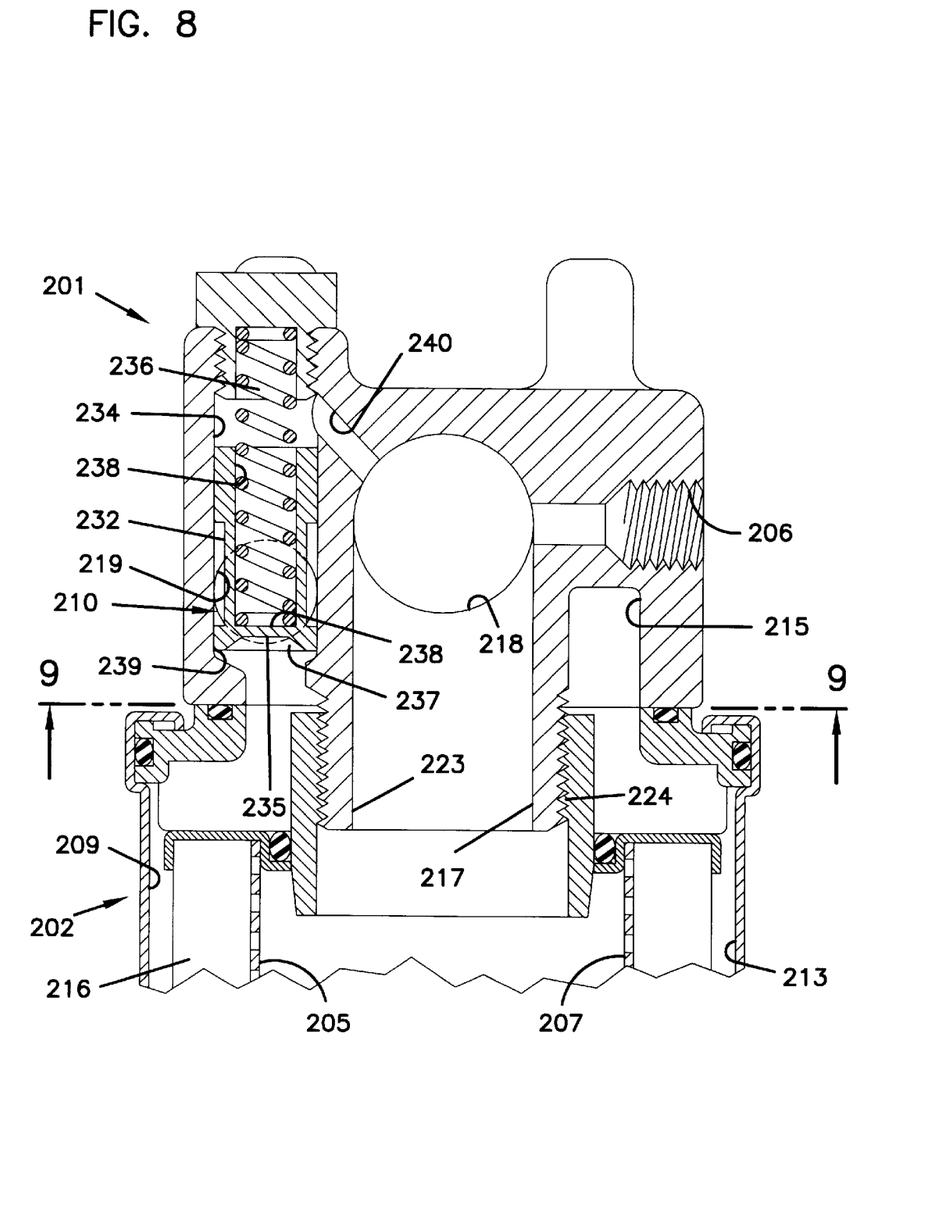
FIG. 8 is a schematic, fragmented, cross-sectional view of an alternative embodiment of a filter head, shown attached to a filter cartridge, according to the present invention.

In FIG. 8, the filter head 201 is illustrated as including a first valve assembly 210. In FIG. 8, the first valve assembly 210 is depicted oriented in a closed position.

The filter head 201 includes a second valve assembly 212, FIG. 11. In FIG. 11, the second valve assembly 212 is shown in a closed orientation.

In general, fluid is filtered by passing through the inlet 204 in the direction of arrow 214 (FIG. 9), through an inlet channel 215 and into the filter cartridge 202, where it becomes part of an unfiltered liquid volume 209. From there, for the outside-in system depicted, the fluid flows through the media construction 216, into an open filter interior 205, where it constitutes part of a filtered liquid volume 207. From the open filter interior 205, the filtered liquid flows into an outlet channel 217 of the filter head 201. During normal operation, that is, when the first valve assembly 210 is closed and the second valve assembly 212 is open, the majority of the fluid flows through port 218 and exits through the second outlet 208. A fraction of the fluid exits through the first outlet 206. From the second outlet 208, the fluid is normally returned to a reservoir or tank. From the first outlet 206, the fluid may flow to sensitive downstream components, such as a pump intake.

If the media construction 216 should become occluded, or during other conditions such as cold starts or flow surges, the first valve assembly 210 moves from its closed orientation, FIG. 8, into an open orientation. When this happens, fluid is allowed to bypass the media construction 216 and flow through port 219. From there, the liquid flowing through port 219 joins the liquid passing through the open second valve assembly 212, and exits through second outlet 208.

B. Filter Head Arrangement

Referring now to FIG. 9, the filter head 201 comprises a block including a body member 220 and an adapter member 221 secured together. Preferably, the body member 220 and the adapter member 221 are aluminum casted materials, defining a series of channels or ports therein to route and direct fluid into and out of the filter cartridge 202.

The body member 220 defines the inlet 204. The inlet 204 has a generally cylindrical cross-section extending radially therein into the inlet channel 215.

The inlet channel 215 is defined by a wall 222 of the body member 220. In the embodiment illustrated, the wall 222 has a cylindrical cross-section. When the filter head 201 is secured to the filter cartridge 202, the inlet channel 215 is in fluid flow communication with the region 213 holding the unfiltered liquid volume 209 in the filter cartridge 202. Together, the outlet channel 217 and the inlet channel 215 define a fluid flow passageway for liquid flowing into and out of the filter head 201 into the filter cartridge 202.

The body member 220 includes a central hub 223, which circumscribes and defines the outlet channel 217. The central hub 223 is spaced from the wall 222, such that the inlet channel 215 is defined therebetween. The hub 223 includes threads 224 for mating engagement with threads on the filter cartridge 202.

Still referring to FIG. 9, the body member defines the first outlet 206. The first outlet 206 is in fluid flow communication with the outlet channel 217. In this way, always filtered fluid can flow from the filter cartridge 202, through the outlet channel 217, and out through the first outlet 206.

Again in reference to FIG. 9, extending from outlet channel 217, and in fluid flow communication therewith, is a channel section, or port 218. Port 218 has a generally cylindrical cross-section, and preferably has a longitudinal axis normal to the longitudinal axis of the outlet channel 217. Port 218 extends from the outlet channel 217 to an outer edge 211 of the body member 220. When the adapter 221 is secured to the body member 220, port 218 is in fluid flow communication with a collector cavity 225 defined by the adapter member 221 (FIG. 10).

Adapter member 221 is constructed and arranged to provide an exit flow for filtered liquid and for unfiltered liquid, while keeping the unfiltered liquid from the first outlet 206. Referring now to FIG. 10, the adapter member 221 defines an adapter flange 226 for mountable securing to the body member 220. The flange 226 includes a planar surface 227, and defines a plurality of through-holes 228. In the embodiment illustrated, there are three mounting holes 228. Holes 228 are for receiving mounting bolts 229, FIG. 9, for securing to the body member 220.

As illustrated in FIG. 11, the second outlet 208 is defined by the adapter member 221, and is in fluid flow communication with the collector cavity 225.

A sealing gasket 230 circumscribes collector cavity 225, and is held by mounting flange 226. Gasket 230 provides a fluid seal 231, FIG. 9, between the collector cavity 225 and the body member 220.

The two-piece construction of the body member 220 and adapter member 221 is preferred because it allows an assembly of die-castings. Die casting is low cost, and the resulting assembly is low weight. Although the two-piece construction could be made as a single piece using alternate manufacturing techniques, the two-piece construction is convenient and preferred.

In FIG. 10, the collector cavity 225 is depicted in fluid flow communication with the port 218 and the port 219. Filtered liquid from the filter cartridge 202 flows through the port 218 and into the collector cavity 225. When conditions exist such that the first valve assembly 210 is in an open orientation, unfiltered liquid flows through port 219 and into the collector cavity 225. From there, the liquid in the collector cavity 225 flows through the second valve assembly 212, typically in an open orientation, and out through the second outlet 208.

Again referring to FIG. 8, the first valve assembly 210 is provided in the filter head 201 and is constructed and arranged to selectively permit passage of liquid from the unfiltered liquid volume 209 in the filter cartridge 202 through the second outlet 208, responsive to a selected liquid pressure differential between the unfiltered liquid volume 209 and the filtered liquid volume 207. In particular, if the media construction 216 in the filter cartridge 202 becomes substantially occluded, or if there is a cold start or flow surge condition, the first valve assembly 210 is provided for dealing with these conditions. The first valve assembly 210 senses when such conditions occur by monitoring the pressure differential between the upstream side and the downstream side of the media construction 216. Once the pressure differential has exceeded a certain predetermined point, the liquid is allowed to bypass the media construction 216. That is, the liquid in the unfiltered liquid volume 209 does not need to pass through the media construction 216. Rather, the liquid in the unfiltered liquid volume 209 proceeds through the port 219, into the collector cavity 225, through the second valve assembly 212 (always open by definition of preferred operating conditions), and out through the second outlet 208.

In the particular arrangement illustrated, the first valve assembly 210 comprises a bypass valve 232. The bypass valve 232 includes a bore 234, typically cylindrical in cross-section, defined by the body member 220. A valve head 235 is biased within the bore 234 by a biasing member 236, for example, a coiled spring. The biasing member 236 permits the valve head 235 to reciprocate linearly within the bore 234 and move between a closed orientation, FIG. 8, and open orientations. The valve head 235 includes an upstream, or first pressure receiving surface 237 and an oppositely disposed, downstream, or second pressure receiving surface 238. The first pressure receiving surface 237 is oriented to bear the liquid pressure forces from the upstream side of the filter cartridge 202. The second pressure receiving surface 238 is oriented to bear the liquid pressure forces from the downstream side of the filter cartridge 202. Stated another way, the unfiltered liquid volume 209 applies pressure to the first pressure receiving surface 237, and the filtered liquid volume 207 applies pressure to the second pressure receiving surface 238.

The bypass valve 232 also includes a valve seat 239, FIG. 8, for providing a surface for the valve head 235 to engage.

Still referring to FIG. 8, a channel 240 provides fluid flow communication between the outlet channel 217 and the bore 234 of the bypass valve 232. Channel 240 provides a fluid conduit to permit filtered liquid to flow into the bypass valve 232 and bear against the second pressure receiving surface 238.

If there is a condition such as an occluded media construction 216, the liquid pressure level within the unfiltered liquid volume 209 will build. The liquid will press on the first pressure receiving surface 237 of the valve head 235. When the force exerted by the liquid pressure on the first pressure receiving surface 237 exceeds the forces exerted by the biasing member 236 and the filtered liquid volume 207 on the second pressure receiving surface 238, the bypass valve 232 will move from its closed orientation into an open orientation. Specifically, the valve head 235 will be pushed by the liquid pressure out of engagement with the valve seat 239. When this happens, the port 219 is open to fluid flow communication from the unfiltered liquid volume 209 into the collector cavity 225, into the second valve assembly 212, and out through the second outlet 208 (when the second valve assembly 212 is in an open orientation, as it is during normal operating conditions).

The above description of bypass valve 232 is of a type described in U.S. Pat. No. 4,883,083 to Fisher et al., hereby incorporated by reference.

In reference now to FIG. 11, the second valve assembly 212 is disposed within the adapter member 221 and is constructed and arranged to selectively permit passage of liquid from the collector cavity 225 through the second outlet 208, in response to a selected liquid pressure level within the collector cavity 225. During normal, typical operation of the assembly 200, the second valve assembly 212 is designed to be open, and permit the majority of liquid passing through the assembly 200 to be returned to a surge tank or reservoir, while creating a back pressure or positive pressure to route a limited quantity, or fraction, of filtered liquid to sensitive downstream components, via first outlet 206.

Again referring to FIG. 11, in the embodiment illustrated, the second valve assembly 212 includes a back pressure flow valve 242 which, when assembled in the arrangement shown, allows the passage of liquid from the collector cavity 225 through the second outlet 208, in response to a liquid pressure level within the collector cavity 225. In the particular arrangement shown in the drawings, the back pressure flow valve 242 includes a bore 243 (typically cylindrical in cross section) defined by the adapter member 221, a valve head 244, a biasing member 246, and a valve seat 247.

The valve head 244 is positioned within the cylindrical bore 243 and includes a pressure receiving surface 245 for bearing liquid pressure forces. The valve head 244 also defines apertures 249, to permit the passage of liquid therethrough, when the back pressure flow valve 242 is in an open orientation.

The valve head 244 is biased by biasing member 246, for example, a coiled spring, situated within the bore 243. The biasing member 246 permits the valve head 244 to reciprocate linearly within the bore 243 and move between a closed orientated, FIG. 11, and open orientations.

The back pressure flow valve 242 includes valve seat 247 defined by the wall of the adapter member 221. The valve seat 247 and the valve head 244 form a seal 248 therebetween, when the back pressure flow valve 242 is in its closed orientation.

During normal, typical, operation, the fluid pressure on the pressure receiving surface 245 is sufficient to cause the back pressure flow valve 242 to be in an open orientation. That is, the back pressure flow valve 242 is moved from touching engagement with the valve seat 247, and the seal 248 is broken. When this happens, liquid in the collection cavity 225 is permitted to flow through the space between the valve seat 247 and the valve head 244 and into apertures 249 in the valve head 244. From there, the liquid flows out through the second outlet 208 and to, for example, a fluid storage tank.

The resistance of the biasing member 246 against the flow of liquid causes a positive pressure, or back pressure, within the filtered liquid volume 207. This positive pressure causes a constant flow of filtered liquid through the first outlet 206. The first outlet 206 is arranged relative to the bypass valve 232, collection cavity 225, and second outlet 208 to ensure that always filtered liquid only flows through the first outlet 206. That is, if the bypass valve 232 is in an open orientation, the unfiltered liquid flows into the collector cavity 225, and out through the second outlet 208. Any particles from the unfiltered liquid will not flow upstream to mix with or contaminate the liquid flowing through the first outlet 206.

The relative positioning of the bypass valve 232 and the media construction 216 allows the bypass valve 232 to reference the pressure differential across the media 216 directly. In addition, because the bypass valve 232 is upstream of the back pressure flow valve 242, the liquid flow through the bypass valve 232 passes through the back pressure flow valve 232, to help ensure that the back pressure flow valve 242 maintains an open orientation; and continuously creates back pressure to maintain the supply of filtered liquid through the first outlet 206.

C. Example Operation

In operation, the filter assembly 200 illustrated in FIGS. 8–12 works as follows:

Liquid to be filtered is conveyed from upstream components to the filter head 201, where it enters in the direction of arrow 214 into the inlet 204. From there, the liquid flows into the inlet channel 215 and then into the filter cartridge 202. During normal, typical conditions, the liquid travels through the media construction 216 and into the filter interior 205. There, the liquid becomes part of the filtered liquid volume 207. The liquid then flows through the outlet channel 217 of the filter head 201. The liquid then passes through the port 218 where it flows into the collector cavity 225 of the adapter member 221. The liquid exerts a liquid pressure force on the back pressure flow valve 242. Typically, the pressure exerted by the liquid in the collector cavity 225 exceeds the force exerted by the biasing member 246, causing the valve head 244 to move out of touching engagement with the valve seat 247. This breaks the seal 248 and opens the liquid flow passageway through apertures 249 and out through the second outlet 208. The liquid then flows to, for example, a surge tank. Due to the back pressure caused by the back pressure flow valve 242, a positive pressure is created, pushing a fraction, or minority, of the filtered liquid through the first outlet 206, where it is conveyed to, for example, an intake port of a sensitive pump.

Should the media construction 216 become occluded, liquid pressure on the first pressure receiving surface 237 of the valve head 235 will begin to build. When the force exerted by the liquid pressure on the first pressure receiving surface 237 of the valve head 235 exceeds the force exerted together by the biasing member 236 and the pressure exerted on the second pressure receiving surface 238, the valve head 235 is moved from touching engagement with the valve seat 239. When this happens, a fluid flow passageway is opened between the inlet channel 215 and the port 219. Therefore, liquid from the unfiltered liquid volume 209 flows from the inlet channel 215, through the port 219, and into the collector cavity 225. From there, the unfiltered liquid joins the filtered liquid to exert pressure on the back pressure flow valve 242. During normal operation, the back pressure flow valve 242 is in an open orientation, and the liquid flows through the second outlet 208. From there, it is normally conveyed directly to a surge tank.

The above specification, examples and data provide a complete description of the invention. Many embodiments of the invention can be made without departing from the spirit and scope of the invention.

I claim:

1. A filter head for use with an associated liquid filter; the filter head comprising:
   (a) a block member defining:
      (i) an inlet port;
      (ii) an inlet channel positioned for fluid communication between said inlet port and the associated liquid filter;
      (iii) a first outlet port;
      (iv) a second outlet port; and
      (v) an outlet channel positioned for fluid communication between the associated liquid filter and at least said first outlet port; and
   (b) a bypass valve assembly, within said block member, having open and closed orientations;
      (i) said bypass valve assembly, when in said open orientation, permitting fluid to flow from said inlet channel and bypass the associated liquid filter;
      (ii) said bypass valve assembly, when in said closed orientation, forcing fluid to flow from said inlet channel and through the associated liquid filter; and
   (c) a back pressure flow valve assembly, within said block member, having open and closed orientations;
      (i) said back pressure flow valve assembly, when in said open orientation, providing fluid communication between the associated liquid filter through said outlet channel and said second outlet port;
      (ii) said back pressure valve assembly, when in said closed orientation, blocking fluid communication between the associated liquid filter through said outlet channel and said second outlet port.

2. A filter head according to claim 1, wherein:
(a) said bypass valve assembly, when in said open orientation, provides fluid communication between said inlet channel and said outlet channel; and when in said closed orientation, blocks fluid communication between said inlet channel and said outlet channel.

3. A filter head according to claim 2, wherein:
(a) said block member includes a body member and an adapter member;
   (i) said body member defining said inlet port, said inlet channel, said outlet channel, and said first outlet port;
   (ii) said adapter member defining said second outlet port.

4. A filter head according to claim 3, wherein:
(a) said adapter member further includes a collector cavity in fluid communication with said outlet channel;
   (i) said bypass valve assembly being constructed and arranged to provide fluid communication between said inlet channel and said collector cavity, when in said open orientation; and to block fluid communication between said inlet channel and said collector cavity, when in said closed orientation.

5. A filter head according to claim 4, wherein:
(a) said bypass valve assembly comprises:
   (i) a first bore defined by said body member;
   (ii) a first spring loaded valve head positioned within said first bore;
   (iii) a first valve seat defined by said body member; and
   (iv) a second bore defined by said body member; said second bore being in fluid-flow communication with said collector cavity;
(b) said bypass valve assembly, when in said closed orientation, having said first valve head biased against said first valve seat, by a first spring member, to block fluid communication between said inlet channel and said second bore; and
(c) said bypass valve assembly, when in said open orientation, having said first valve head biased against said first spring member and away from said first valve seat, to permit fluid communication between said inlet channel and said second bore.

6. A filter head according to claim 5, wherein:
(a) said bypass valve assembly further includes a conduit defined by said body member in extension between said outlet channel and said first bore.

7. A filter head according to claim 6 wherein:
(a) said back pressure valve assembly comprises:
   (i) a bore defined by said adapter member;
   (ii) a valve head positioned within said bore; and
   (iii) a valve seat defined by said adapter member;
(b) said back pressure valve assembly, when in said closed orientation, having said valve head biased against said valve seat, by a biasing member, to block fluid communication between said collector cavity and said second outlet port; and
(c) said back pressure valve assembly, when in said open orientation, having said valve head biased against said biasing member and away from said valve seat, to permit fluid communication between said collector cavity and said second outlet port.

8. A filter head according to claim 7, including:
(a) a gasket member circumscribing said collector cavity.

9. A filter head according to claim 8, wherein:

(a) said outlet channel includes a first channel section and a second channel section, oriented normal relative to each other;
   (i) said first channel section extending between the associated liquid filter and said second channel section; and
   (ii) said second channel section extending between said first channel section and said collector cavity.

10. A filter head according to claim 9, wherein:
(a) said body member includes a projecting hub circumscribing said outlet channel; said hub having a threaded section oriented for mating engagement with the associated liquid filter.

11. A liquid filter assembly comprising:
(a) a filter housing;
(b) a filter media construction positioned within said housing; said filter media construction, in combination with said housing, defining:
   (i) an unfiltered liquid volume; and,
   (ii) a filtered liquid volume;
(c) a filter head in fluid communication with said filter housing; said filter head including:
   (i) an inlet for conveying liquid to said unfiltered liquid volume;
   (ii) a first outlet;
   (iii) an outlet channel for conveying liquid from said filtered liquid volume to said first outlet;
   (iv) a collector cavity downstream of, and in liquid flow communication with, said outlet channel, said collector cavity constructed and arranged to accept liquid from the filtered liquid volume and liquid from the unfiltered liquid volume; and
   (v) a second outlet in liquid flow communication with said collector cavity;
(d) a first valve assembly constructed and arranged to selectively permit passage of liquid from said unfiltered liquid volume and into said collector cavity, in response to a selected liquid pressure differential between said unfiltered liquid volume and said filtered liquid volume; and
(e) a second valve assembly, disposed within said filter head, constructed and arranged to selectively permit passage of liquid from said collector cavity through said second outlet, in response to a selected liquid pressure level within said collector cavity.

12. A liquid filter assembly according to claim 11 wherein:
(a) said filter media construction comprises a cylindrical extension of media defining an internal volume;
   (i) said filter media internal volume comprising said filtered liquid volume.

13. A liquid filter assembly according to claim 12 wherein:
(a) said housing comprises an elongate, generally cylindrical wall having an open end, an opposite closed end, and a cover member disposed over said open end;
   (i) said cover member including a hub constructed and arranged to be secured to said filter head; said hub being in liquid-flow communication with said filtered liquid volume; and said hub being in liquid-flow communication with said first outlet, when secured to said filter head.

14. A liquid filter assembly according to claim 13 wherein:
(a) said filter media construction comprises first and second end caps with said cylindrical extension of media extending therebetween;

(i) said first end cap having an open central aperture circumscribing said cover member hub.

15. A liquid filter assembly according to claim 14 wherein:
(a) said first valve assembly and said second valve assembly are disposed within said filter head.

16. A liquid filter assembly according to claim 15 wherein:
(a) said filter head comprises a body member and an adapter member secured thereto;
(i) said body member defining said inlet and said first outlet; and
(ii) said adapter member defining said collector cavity and said second outlet.

17. A liquid filter assembly according to claim 16 wherein:
(a) said first valve assembly comprises:
(i) a first bore defined by said body member;
(ii) a first spring loaded valve head positioned within said first bore;
(iii) a first valve seat defined by said body member; and
(iv) a second bore in liquid flow communication with said collector cavity;
(b) said first valve assembly, when in a closed orientation, having said first valve head biased against said first valve seat, by a first spring member, to block passage of liquid flow from said unfiltered liquid volume and to said collector cavity; and
(c) said first valve assembly, when in an open orientation, having said first valve head biased against said first spring member and away from said first valve seat, to permit passage of liquid flow from said unfiltered liquid volume, through said second bore, and into said collector cavity.

18. A liquid filter assembly according to claim 17, wherein:
(a) said first and second bores of said first valve assembly have cylindrical cross-sections.

19. A liquid filter assembly according to claim 17, wherein:
(a) said first valve assembly further includes a conduit defined by said body member in extension between said outlet channel and said first bore.

20. A liquid filter assembly according to claim 17 wherein:
(a) said second valve assembly comprises:
(i) a bore defined by said adapter member and in liquid flow communication with said collector cavity;
(ii) a valve head positioned within said bore; and
(iii) a valve seat defined by said adapter member;
(b) said second valve assembly, when in a closed orientation, having said valve head biased against said valve seat, by a biasing member, to block passage of liquid flow from said collector cavity through said second outlet; and
(c) said second valve assembly, when in an open orientation, having said valve head biased against said biasing member and away from said valve seat, to permit passage of liquid flow from said filtered liquid volume through said second outlet.

* * * * *